Figures 1, 2:
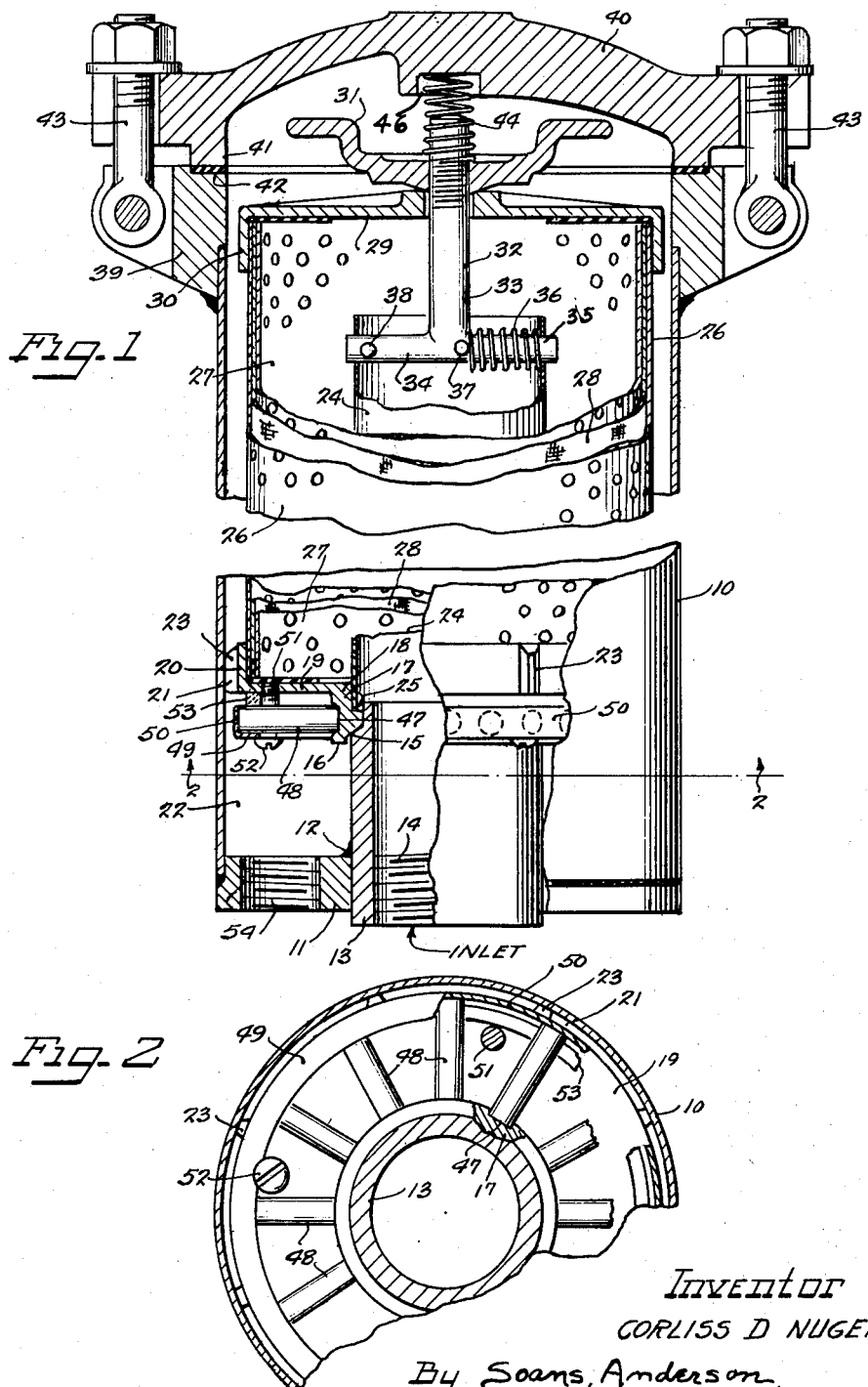

United States Patent Office 3,164,551
Patented Jan. 5, 1965

3,164,551
MAGNETIC CLEANER FOR FLUIDS
Corliss D. Nugent, Winnetka, Ill., assignor to Wm. W. Nugent & Co. (Inc.), Skokie, Ill., a corporation of Illinois
Filed Aug. 2, 1960, Ser. No. 47,097
4 Claims. (Cl. 210—223)

This invention relates to cleaners for fluids and has a special application in removing magnetic particles from fluids such as oil. Also, it is of particular value when combined with a strainer or filter for removing other foreign material from fluids.

In the cleaning of lubricating and other industrial fluids which have become contaminated with ordinary dirt or other undesired foreign matter, it has become more and more important to remove particles of ferrous metals which have been acquired by the oil or other fluid as a result of use or otherwise. The removal of relatively large particles of dirt, or similar contaminants from the used fluid has become reasonably well standardized, but some difficulty has been involved in the removal of very fine particles of ferrous metals, the presence of which, in oils for certain uses is quite undesirable.

Strainers or filters involving the use of a foraminous screen or membrane have been generally used for the removal of unwanted foreign substances from fuel oil or other liquids and from oil used and often circulated in industrial operations, for example, in the bearings of movable mechanical devices or in connection with the operation of devices such as transformers or other electrical equipment or machine tool operations, as well as engines and motors. In any case, the fluid is generally cleaned, strained or filtered before it is delivered or returned to the point where it is to be consumed or re-used. Hence, the cleaning or separation process generally is effected by interposing a suitable device such as a filter, strainer or a separator in the flow of a continuous or intermittent stream of the fluid.

The principal object of the subject matter herein described is to provide an efficient device or method for removing, from a flowing stream of fluid, those finely divided ferrous particles which cannot ordinarily be removed or separated efficiently from a flowing stream by the usual filters or strainers such as are employed in conventional equipment.

Another object of the invention is to provide a unitary combination in which magnetic separation of the finely divided ferrous particles is effected in conjunction with a more or less conventional means for removing the coarser particles of unwanted foreign materials.

A more specific object of the invention is to combine a conventional strainer or filter with means for also removing the fine ferrous particles in a way which will permit the magnetic separation means and the conventional strainer type cleaning means to be serviced at the same time so that the accumulations of the ferrous material particles and of the other coarse materials can be discharged and the entire device cleaned and washed off as a single operation, without requiring the handling and servicing of two separate devices.

The drawings accompanying this application show a strainer combined with a magnetic separator for separating small ferrous particles from a flowing stream of a fluid such as oil. The invention is illustrated as applied to a device used in combination with a suitable strainer by which the larger particles of ferrous materials and other unwanted contaminants are intercepted by a screen made of wire cloth or other suitable filtering medium. The strainer herein shown is of the basket type and in this instance, the oil flows downwardly.

In said drawings:
FIGURE 1 is a side elevation of the combined device, shown partly in section; and
FIGURE 2 is a plan view, partly in section, looking along the line 2—2 of FIGURE 1.

The numeral 10 represents a stout outer casing which, preferably in the case of a downward flow, takes the form of an axially vertical metal shell. The lower end of said shell 10 is welded to the periphery of a circular plate or disc 11 in the center of which there is secured as by welding 12 an upstanding cylindrical sleeve or nipple element 13, the lower end of which is threaded as shown at 14 to accommodate an inlet pipe (not shown) by which the fluid to be treated is fed into the device.

The upper end of the nipple or feed pipe 13 is extended upwardly and at its upper end has an annular seat which is bevelled as shown at 15 to fit a similarly bevelled lower edge of the depending annular flange 16 of a casting 17. Said casting 17 is made with a hub 18 from which extends an annular flange or plate 19 terminating in an upstanding cylindrical flange 20. Said flange 20 is spaced from the interior of the wall of the casing 10 to form a peripheral, annular duct 21 which accommodates downward flow of the fluid from the upper end of the casing 10 into the lower chamber 22, which chamber collects the strained and filtered fluid. The partition element 17 is centered in the casing by a circumferential series of small, narrow upstanding ribs 23 integral with the flange 20. Said ribs 23 are of sufficiently close fit in the casing to maintain the uniformity of the spacing of the peripheral duct 21 around the circumference of the duct, while at the same time the fit is free enough to permit the partition 18 to be withdrawn upwardly and out of the casing when occasion requires.

Said partition element 18 serves as a support for the outer screen and also as a support for an internal standpipe 24 which, in effect, is an extension of the feed pipe element 13, so that when fluid is fed upwardly through the said pipe 13 it finally flows out of the open upper end of the standpipe. The lower end of the standpipe 24 is made of a size to fit into a central rabbet on the hub 17 and secured therein by any conventional means such as rivets 25.

The basket strainer may be of a type which includes a perforated metal cylindrical inner tube 27 and a similar outer perforated tube 26 between which tubes 26 and 27 there is interposed a screen 28 of appropriate type for the work involved, for example, a wire cloth of about 100 mesh. The upper end of the axially vertical tubular screen extends above the upper end of the standpipe 24. On the upper end of the basket, there is a top plate or disc 29 having a peripheral downwardly extending cylindrical flange 30 which fits snugly around the exterior jacket 26 of the strainer, and said top plate 29 of the basket is pressed downwardly by a circular nut element 31 which is threaded on a central stem 32 which constitutes the upper end of a T-headed tie-bolt 33.

On the lower end of said tie-bolt 33 there is a cross bar 34 in the form of a transverse round rod, the arms of which are adapted to slide rather loosely in apertures formed in opposite sides of the upper end of the standpipe 24. Around the arms 35 of the cross bar 34 there is placed a compression spring 36, the outer end of which engages the inside of the standpipe 24 and the inner end of which engages and pushes against the ends of a stop pin 37 at the inner end of the arm 35. The horizontal movement of the cross bar 34 under the influence of the compression spring 36 is limited by another stop pin 38 which is carried by and engages the inside of the opposite side of the standpipe 24. Said arrangement permits the T-shaped lifter rod 33 to be detached

Jan. 5, 1965

C. D. NUGENT 3,164,551

MAGNETIC CLEANER FOR FLUIDS

Filed Aug. 2, 1960

Inventor
CORLISS D NUGENT
By Soans, Anderson,
Luedeka + Fitch
Attys

3. In a device for removing foreign particles from a flowing stream of fluid, the combination of an outer axially vertical tubular casing, a partition mounted in the lower end of said casing and providing an outlet-chamber between the bottom end of said casing and said partition, said partition having its outer periphery spaced from the wall of said casing to provide a peripheral duct for conducting fluid into said chamber, an inner basket strainer within said casing and having an outer foraminous, tubular, axially vertical strainer-screen spaced from said casing, the lower end of said basket being mounted on said partition and having its upper end located at the upper end of said casing, a feed pipe extending within the basket from the lower end of said casing to an upper level in the basket and comprising two separable parts, the lower part of the pipe being integrated with the casing and the upper part being integrated with the basket, said casing having at its lower end, below said partition, an outlet for discharging fluid from said chamber, and said casing being provided with a movable closure element at its upper end so that when said closure is removed, the basket and the partition may be withdrawn as a unit from the casing, without disturbing the outlet or the lower part of the feed pipe.

4. In a device for removing magnetic, and other foreign, particles from a liquid, the combination of
   (a) a tubular axially vertical circular outer casing having an outlet at its lower end
   (b) an axially vertical outward flow basket type filter in said casing above said outlet and provided at its upper end with an inlet for admitting said liquid into said filter
   (c) a circular member concentrically mounted within said casing between said outlet and said filter with its outer periphery spaced from the casing to form a concentric peripheral duct for passage of filtered liquid downwardly from the filter to the outlet
   (d) a peripheral rim of magnetizable material concentric with said duct positioned below the outlet end of said duct to as to attract and arrest magneic paricles in said filtered fluid, and
   (e) magnetizing means arranged to impart magnetic polarity of like sign to the entire periphery of said rim.

References Cited by the Examiner

UNITED STATES PATENTS

| | | | |
|---|---|---|---|
| 2,317,774 | 4/43 | Kiek et al. | 210—222 |
| 2,838,179 | 6/58 | Thomas | 210—223 |

FOREIGN PATENTS

| | | |
|---|---|---|
| 535,031 | 10/55 | Italy. |
| 1,016,878 | 10/57 | Germany. |
| 1,171,185 | 9/58 | France. |

REUBEN FRIEDMAN, *Primary Examiner.*

HERBERT L. MARTIN, *Examiner.*